(12) United States Patent
Berner et al.

(10) Patent No.: US 10,587,560 B2
(45) Date of Patent: Mar. 10, 2020

(54) UNIFIED REAL-TIME AND NON-REAL-TIME DATA PLANE

(71) Applicant: General Electric Company, Schenectady, NY (US)

(72) Inventors: Andrew William Berner, Waterford, NY (US); Martin Smith, Stafford (GB); Dragan Stankovic, Markham (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 84 days.

(21) Appl. No.: 15/805,592

(22) Filed: Nov. 7, 2017

(65) Prior Publication Data
US 2019/0141000 A1 May 9, 2019

(51) Int. Cl.
*H04L 12/58* (2006.01)
*H04L 29/08* (2006.01)
(Continued)

(52) U.S. Cl.
CPC ............ *H04L 51/26* (2013.01); *G06F 9/544* (2013.01); *H04L 51/04* (2013.01); *H04L 65/40* (2013.01);
(Continued)

(58) Field of Classification Search
CPC ....................................................... H04L 65/40
See application file for complete search history.

(56) References Cited

U.S. PATENT DOCUMENTS

| | | | |
|---|---|---|---|
| 7,093,256 B2 * | 8/2006 | Bloks | G06F 9/4887 370/395.4 |
| 7,289,514 B2 | 10/2007 | Robotham et al. | |

(Continued)

OTHER PUBLICATIONS

Stoica et al., "A proportional share resource allocation algorithm for real-time, time-shared systems", 17th IEEE Real-Time Systems Symposium, pp. 288-299, 1996, 12 pp.

(Continued)

*Primary Examiner* — Lashonda T Jacobs
(74) *Attorney, Agent, or Firm* — Buckley, Maschoff & Talwalkar LLC

(57) ABSTRACT

According to some embodiments, system and methods are provided, comprising at least one asset; a computer programmed with a data share module for the asset, the data share module for controlling data flow in the asset; the computer including a data share processor and a memory in communication with the data share processor, the memory storing the data share module and additional program instructions, wherein the data share processor is operative with the data share module and additional program instructions to perform functions as follows: receiving a message from a source at the data share module; determining, via the data share module, whether the source is one of a non-real time domain of the asset and the real-time domain of the asset; determining, via the data share module, when a destination is able to respond to the message, wherein the destination is one of the non-real time domain and the real-time domain, and wherein the destination is different from the source; transmitting, via the data share module, the message directly to the destination when the destination is able to respond to the message; receiving a response to the message; and generating an operating response of the asset based on the response. Numerous other aspects are provided.

21 Claims, 5 Drawing Sheets

(51) Int. Cl.
*G06F 9/54* (2006.01)
*H04L 29/06* (2006.01)

(52) U.S. Cl.
CPC ............ *H04L 67/12* (2013.01); *H04L 69/30* (2013.01); *H04L 69/321* (2013.01); *H04L 67/42* (2013.01); *H04L 69/16* (2013.01)

(56) References Cited

U.S. PATENT DOCUMENTS

| | | | |
|---|---|---|---|
| 7,519,076 | B2 | 4/2009 | Janssen et al. |
| 7,747,735 | B1* | 6/2010 | Kahn ................... A61B 5/0002 709/224 |
| 7,852,879 | B2 | 12/2010 | Arnold et al. |
| 7,970,014 | B2 | 6/2011 | Voith et al. |
| 8,064,482 | B2* | 11/2011 | Krause ................ H04L 12/6418 370/468 |
| 8,255,791 | B2* | 8/2012 | Koren ................... G06F 3/0484 715/227 |
| 8,509,953 | B2* | 8/2013 | Taft ........................ G01D 4/002 700/286 |
| 8,650,270 | B2 | 2/2014 | Gerovac et al. |
| 8,929,217 | B2 | 1/2015 | Torres et al. |
| 9,348,897 | B2* | 5/2016 | Shoham ................. G06F 16/335 |
| 9,740,513 | B2* | 8/2017 | Gatherer ................. G06F 9/455 |
| 2001/0023445 | A1* | 9/2001 | Sundqvist ........... H04L 12/6418 709/228 |
| 2005/0251806 | A1* | 11/2005 | Auslander ........... G06F 9/45533 718/100 |
| 2007/0089114 | A1* | 4/2007 | MacInnis .............. G06F 9/4887 718/103 |
| 2016/0274558 | A1* | 9/2016 | Strohmenger ...... G05B 19/0428 |
| 2017/0220011 | A1* | 8/2017 | Hart ........................ H04L 67/12 |
| 2018/0004953 | A1* | 1/2018 | Smith, II ............. G06F 21/575 |
| 2018/0225135 | A1* | 8/2018 | Xiao ....................... H04L 63/14 |
| 2018/0234514 | A1* | 8/2018 | Rajiv ................... H04L 67/125 |
| 2018/0246981 | A1* | 8/2018 | Wei ........................ G06F 16/435 |

OTHER PUBLICATIONS

Itin et al., "Optimising non-real time frame handling in real time ethernet nodes", 2015 IEEE World Conference on Factory Communication Systems (WFCS), pp. 1-8, 2015, 8 pp.

* cited by examiner

UNIFIED REAL-TIME AND NON-REAL-TIME DATA PLANE

BACKGROUND

Industrial equipment or assets, generally, are engineered to perform particular tasks as part of industrial processes. The design and implementation of these assets often takes into account both the physics of the task at hand, as well as the environment in which such assets are configured to operate and the specific operating control these systems are assigned to. Various types of control systems communicate data between different sensors, devices, user interfaces, etc. in order to enable control operations of the industrial asset and other powered systems.

Often the control systems require applications for the execution thereof. The applications executing in control systems are typically applications for executing real-time systems of the asset or non-real-time systems of the asset. The data associated with the real-time system may be transmitted within an isolated real-time data plane, while the data associated with the non-real-time system may be transmitted within an isolated non-real-time data plane. As such, it may be challenging to communicate between the isolated data planes.

It would be desirable to provide systems and methods to improve the sharing of data between real-time and non-real-time systems.

BRIEF DESCRIPTION

According to some embodiments, a system includes at least one asset; a computer programmed with a data share module for the asset, the data share module for controlling data flow in the asset; the computer including a data share processor and a memory in communication with the data share processor, the memory storing the data share module and additional program instructions, wherein the data share processor is operative with the data share module and additional program instructions to perform functions as follows: receiving a message from a source at the data share module; determining, via the data share module, whether the source is one of a non-real time domain of the asset and the real-time domain of the asset; determining, via the data share module, when a destination is able to respond to the message, wherein the destination is one of the non-real time domain and the real-time domain, and wherein the destination is different from the source; transmitting, via the data share module, the message directly to the destination when the destination is able to respond to the message; receiving a response to the message; and generating an operating response of the asset based on the response.

According to some embodiments, a method includes receiving a message from a source at the data share module; determining, via the data share module, whether the source is one of a non-real time domain of the asset and the real-time domain of the asset; determining, via the data share module, when a destination is able to respond to the message, wherein the destination is one of the non-real time domain and the real-time domain, and wherein the destination is different from the source; transmitting, via the data share module, the message directly to the destination when the destination is able to respond to the message; receiving a response to the message; and generating an operating response of the asset based on the response.

According to some embodiments, a non-transitory, computer-readable medium storing instructions that, when executed by a computer processor, cause the computer processor to perform a method including: receiving a message from a source at the data share module; determining, via the data share module, whether the source is one of a non-real time domain of the asset and the real-time domain of the asset; determining, via the data share module, when a destination is able to respond to the message, wherein the destination is one of the non-real time domain and the real-time domain, and wherein the destination is different from the source; transmitting, via the data share module, directly to the destination, the message when the destination is able to respond to the message; receiving a response to the message; and generating an operating response of the asset based on the response.

A technical effect of some embodiments of the invention is an improved and/or computerized technique and system for connecting a real-time and a non-real-time data plane, making a more secure and efficient networked communication system. Another technical effect of some embodiments is that connecting a real-time and non-real-time data plane may allow easy access to data from both domains in a safe and protected manner such that messages from the non-real-time domain do not interfere with the operations of the real-time side, which may be critical operations. Yet another technical effect of embodiments is the merging of real-time and non-real-time data planes into one unified data plane that may satisfy the requirements of both domains. For example, real world benefits include the ability to add or modify non-real-time applications that may use data from the real-time domain to provide services. Examples of these services include, but are not limited to, prognostic health monitoring, asset management and future edge applications without requiring changing the real-time application, which may often be safety certified and difficult to update. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
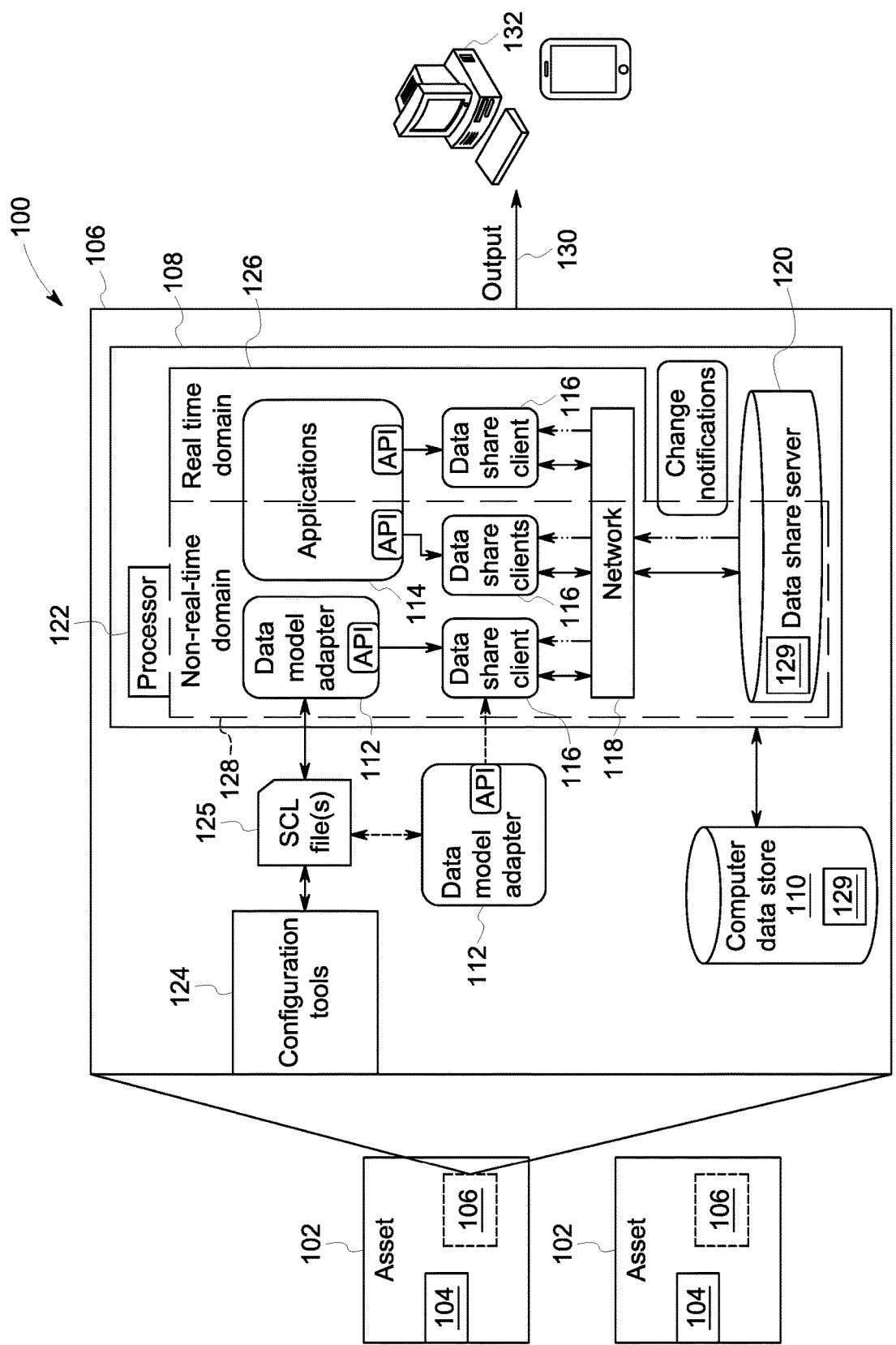
FIG. 1 illustrates a system according to some embodiments.

Industrial equipment or assets, generally, are engineered to perform particular tasks as part of industrial processes. For example, industrial assets may include, among other things and without limitation, manufacturing equipment on a production line, aircraft engines, wind turbines that generate electricity on a wind farm, power plants, locomotives, health care and/or imaging devices (e.g., X-ray or MIR systems) or surgical suites for use in patient care facilities, or drilling equipment for use in mining operations. The design and implementation of these assets often takes into account both the physics of the task at hand, as well as the environment in which such assets are configured to operate and the specific operating control these systems are assigned to. Various types of control systems communicate data between elements or nodes of the industrial asset (e.g., different sensors, devices, user interfaces, etc.) per the instructions of an application, in order to enable control operations of the industrial asset and other powered systems in a real-time (RT) domain.

During RT operations, an RT domain may produce a lot of data that may be consumed at the RT domain to operate the asset. The Non-Real-Time (NRT) domain may produce NRT data consumed by the NRT domain for reporting and analysis, for example. However it may be desirable for the NRT domain to obtain data produced form the RT domain for the reporting and analysis. For example, the RT domain may have access to valves that control the fuel flow into a turbine. It may be undesirable to give control of these valves to the NRT domain because it may negatively impact the operations (e.g., stall the system, turn off power, blow up a sub-station) because it is not designed to operate in a real-time manner. As such, the data transmitted within a RT data plane is typically isolated from the data transmitted within a NRT data plane. And conventionally, to communicate between the two data planes, the communication may be routed through several levels of a hierarchical communication network. As such, it may be a challenge to communicate between the isolated data planes. However, being able to see how the valve is controlled (e.g., valve levels, switching rates, etc.) may allow the NRT domain to make observations (e.g., is the system healthy? Is the switch working well), and, in one or more embodiments, make suggestions to change the operation of the asset.

In one or more embodiments, a data share module may connect the real-time data plane and non-real-time data plane to transfer data in such a way to satisfy reporting, logging, and human-machine-interface requests. The inventors note that benefits of the direct transfer of data may include, for example, 1. The ability to ask for data the domain didn't conventionally have direct access to and 2. The NRT domain may make commands/suggestions for how the RT domain should operate. Although, the RT domain may ultimately determine whether it should execute the commands/suggestions provided by the NRT domain. The data share module may ensure that the real-time domain handles the non-real-time messages (e.g., request for data, instructions for operation) in a manner that may not interfere with real-time operation of the asset. In one or more embodiments, the data share module may decouple the software modules running on the asset based on details of how and where the data is produced and stored on a product/asset platform. In one or more embodiments, the meaning of data values and its organization may be asset-specific. In one or more embodiments, the data stored in the data share module may be organized as key/value pairs or other suitable data structures that may provide information on the data being transferred from domain to domain. In addition to storing and retrieving the values of the corresponding keys, the data share module may, in one or more embodiments, provide: a solution for buffering time tagged data for processing by communication servers and recorder features; notifications about setting changes to subscribed client entities; notifications about availability of new sets of time tagged data to be further processed by communication servers, recording applications and similar; facilities to handle various auxiliary data lists and sets for applications like web server and loggers; and facilities to exchange supervisory and self-test messages among various application modules.

In one or more embodiments, the data share module may, for example, evaluate the message to the real-time domain from the non-real-time domain for factors such as timeliness, validity, data sequence, etc. and then may publish a response to the message at the earliest opportunity that does not interfere with real-time operations.

The term "installed product" should be understood to include any sort of mechanically operational entity or asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain and etc. As used herein, the terms "installed product," "asset," and "powered system" may be used interchangeably.

As used herein, the term "automatically" may refer to, for example, actions that may be performed with little or no human interaction.

FIG. 1 is a block diagram of an example operating environment or system 100 in which a data share module 108 may be implemented, arranged in accordance with at least one embodiment described herein. FIG. 1 represents a logical architecture for describing processes according to some embodiments, and actual implementations may include more or different components arranged in other manners.

The system 100 may include at least one "installed product" 102. While two assets 102 are shown herein to represent a fleet of assets 102, any suitable number may be used. In one or more embodiments, each asset 102 may include a RT control domain 126 and an NRT control domain 128. It is noted that each asset 102 may include a platform 106. As noted above, the asset 102 may be, in various embodiments, a complex mechanical entity such as the production line of a factory, a gas-fired electrical generating plant, a jet engine on an aircraft amongst a fleet (e.g., two or more aircrafts or other assets), a wind farm (e.g., two or more wind turbines), a locomotive, medical equipment etc. The asset 102 may include a considerable (or even very large) number of physical elements or components 104, which for example may include turbine blades, fasteners, rotors, bearings, support members, housings, etc. As used herein, the terms "physical element" and "component" may be used interchangeably. The asset 102 may also include subsystems, such as sensing and localized control, in one or more embodiments.

In some embodiments, the platform 106 may include a computer data store 110 that may provide information to the data share module 108 and store results from the data share module 108. In one or more embodiments, the data share module 108 may be in the RT domain 126. In one or more embodiments, the NRT domain 128 may not connect directly to the RT domain 126. Data flow management may be done by a RT data share module 108, but the data share may be on the NRT domain 128. The data share module 108 may include a data model adapter component 112, at least one application 114, one or more data share clients 116, a network 118, a data share server 120 and one or more processing elements 122. The platform 106 may also include configuration tools 124, one or more SCL files 125, and a data model adapter component 112.

In one or more embodiments, the configuration tools 124 may operate on asset-specific data models and may generate product-specific Substation Configuration description Language (SCL) configuration file 125. In one or more embodiments, the SCL files 125 may be exchanged with the data share module 108. A data model adapter component 112 may be internal or external to the data share module 108 in one or more embodiments. The data model adapter component 112 may provide for bi-directional translation between the domain specific data models (e.g., RT or NRT) and data 129 held in the data share module 108.

In one or more embodiments, the data share server 120 may store the data 129. Each data 129 item may be identified by a key and may have an associated value. In one or more embodiments, the data share module 108 may notify software applications of changes in the values of data 129 (e.g., updates such as new sensor acquisition, newly calculated values, system events, etc.) per pre-configured rules. Examples of pre-configured rules include, but are not limited to streaming the change when available and updating per schedule, etc. In one or more embodiments, the data share server 120 may be based on an in-memory data structure store, used as a database, cache and message broker. In one or more embodiments, the data share server 120 may provide persistence for stored data 129, as needed.

The data share client(s) 116 may be a library linked to the application 114 where access to the data 129 is needed.

The processor 122 may, for example, be a conventional microprocessor, and may operate to control the overall functioning of the data share module 108. In one or more embodiments, the processor 122 may be programmed with a continuous or logistical model of industrial processes that use the one or more assets 102.

In one or more embodiments, the data store 110 may comprise any combination of one or more of a hard disk drive, RAM (random access memory), ROM (read only memory), flash memory, etc. The data store 110 may store software that programs the processor 122 and the data share module 108 to perform functionality as described herein.

The data store 110 may comprise any one or more systems that store data 129 that may be used by the module. The data 129 stored in data store 110 may be received from disparate hardware and software systems associated with the installed product 102, or otherwise, some of which are not inter-operational with one another. The systems may comprise a back-end data environment employed in a business, industrial, or personal context. The data 129 may be pushed to data store 110 and/or provided in response to queries received therefrom.

The data store 110 may support multi-tenancy to separately support multiple unrelated clients by providing multiple logical database systems which are programmatically isolated from one another. The data 129 may be included in a relational database, a multi-dimensional database, an eXtendable Markup Language (XML) document, and/or any other structured data storage system. The physical tables of data store 110 may be distributed among several relational databases, multi-dimensional databases, and/or other data sources. The data of data store 110 may be indexed and/or selectively replicated in an index. The data store may comprise any query-responsive data source or sources that are or become known, including but not limited to a structured-query language (SQL) relationship The data store 110 may implement as an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data 129 comprises one or more of conventional tabular data, row-based data stored in row format, column-based data stored in columnar format, time series data in a time series data store, and object-based data.

The data share module 108, according to some embodiments, may access the data store 110 and utilize the processing elements 122 to determine when to transfer data between the real-time domain 126 and the non-real-time domain 128. In one or more embodiments, output 130 (e.g., response to the message) from the data share module 108 may be transmitted to various user platforms 132 or to other systems (not shown), as appropriate (e.g., for display to, and manipulation by, a user) via the NRT domain 128. In one or more embodiments, the output 130 may be used to operate the installed product, operate another system, or by input to another system.

In some embodiments, received output may cause modification in the state or condition or another attribute of the asset 102.

As used herein, devices, including those associated with the system 100 and any other devices described herein, may exchange information and transfer input and output ("communication") via any number of different systems. In one or more wide area networks (WANs) and/or local area networks (LANs) that enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

A user may access the system 100 via one of the user platforms 132 (a control system, a desktop computer, a laptop computer, a personal digital assistant, a tablet, a smartphone, etc.) to view information about and/or manage the asset 102 in accordance with any of the embodiments described herein.

Figure 2:
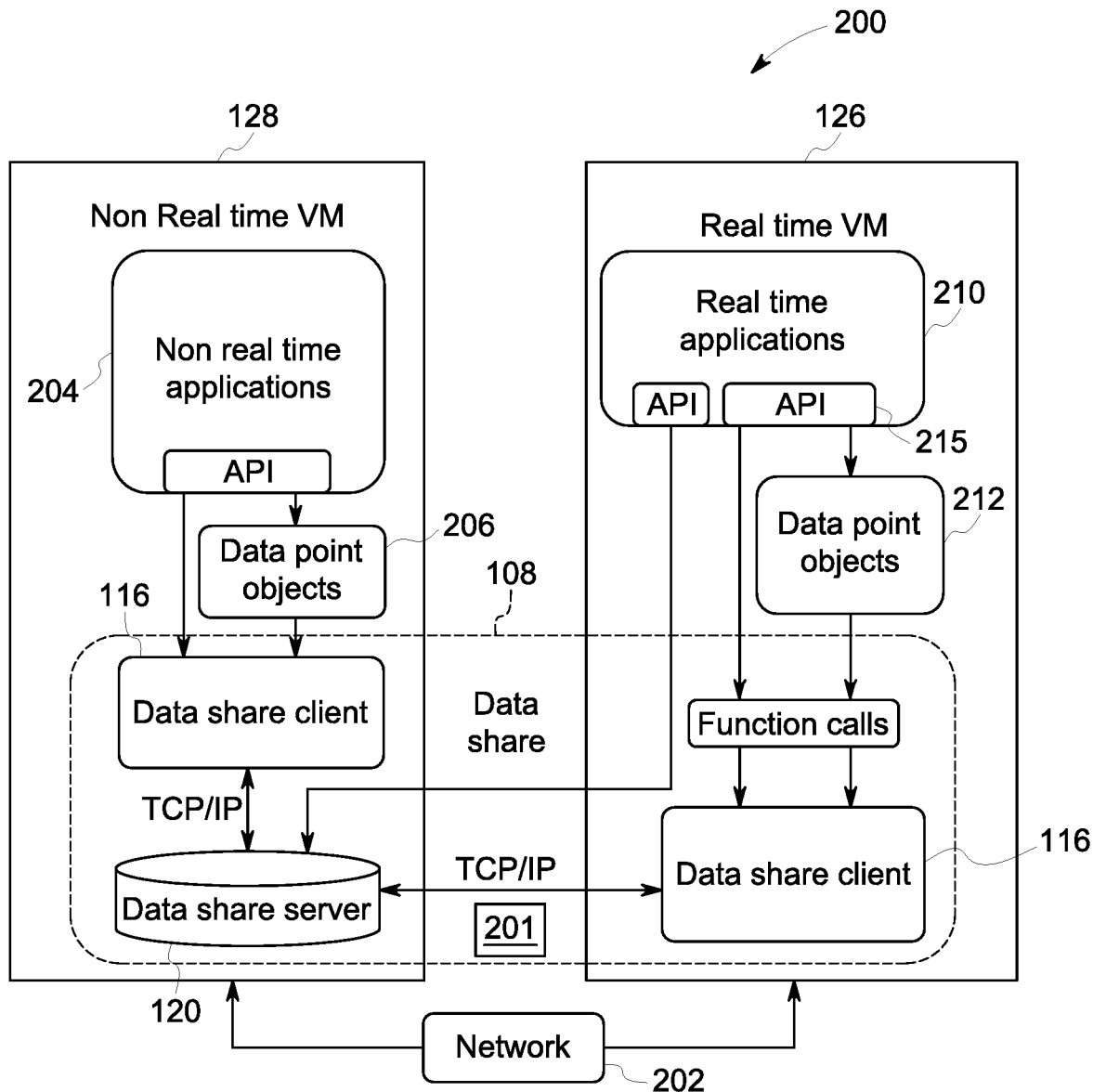
FIG. 2 illustrates a block diagram of a system according to some embodiments.

Turning to FIG. 2, a data share module 108 deployment architecture 200 is provided according to one or more embodiments. The data share module 108 may operate across real-time (RT) domain 126 and the non-real-time (NRT) domain 128. In one or more embodiments, the data share module 108 may provide for communication between the RT domain 126 and the NRT domain 128 using TCP/IP, for example, via a private inter-virtual machine network 202. Other suitable communication protocols may be used (e.g., OPC-UA, DDS, etc.) In one or more embodiments, the NRT domain 128 may include at least one NRT application 204, at least one NRT data point object 206, and a data share client 208. In one or more embodiments, the RT domain 126 may include at least one RT application 210, at least one RT data point object 212 and a data share client 116. As used herein, data point objects may refer to discrete objects belonging to applications.

In one or more embodiments, NRT applications 204 and RT applications 210 may access data 129 stored in the data share server 120 by the same application programming interface (API) 215. In one or more embodiments, the data share server 120 may be located in the NRT domain 128, as the NRT domain 128 may be more configurable than the RT domain 126. It is noted that if the RT domain 126 hosted the data share server 120, the system 100 may be limited due to the deterministic demands of the RT domain 126 (e.g., there may be less total system capability (performance)). In one or more embodiments, the RT applications 210 may have an additional set of APIs for accessing local RT data point objects 212 by using one or more RT function calls 216 for optimum run time performance. In one or more embodiments, NRT applications 204 may re-use data point objects (e.g., data source) if necessary.

In one or more embodiments, the data share module 108 may be implemented using any suitable data structure that provides a seamless persistence feature for configuration data, fast processing of the actual values and a supervisory message exchange. For example, Redis, DDS, MQTT, etc.

In one or more embodiments, authentication and authorization of the message (e.g., user/requestor, requested data, etc.) may occur on the NRT domain. A benefit of this may be that no unauthorized or unknown commands are received at the RT domain. It is noted that since the NRT domain 128 may be more flexible/configurable than the RT domain 126, the NRT domain 128 may also use strong security. As such, the NRT domain 128 may, in one or more embodiments, handle validating external commands, requests and configuration changes ("messages"). A system that has connectivity to the RT domain 126 may handle the authentication and authorization of those messages, but, the inventors note that as more connectivity exists on the NRT domain 128, compared to the RT domainl 26, the NRT domain 128 may handle most to all of the authentication and authorization issues.

Figure 3:
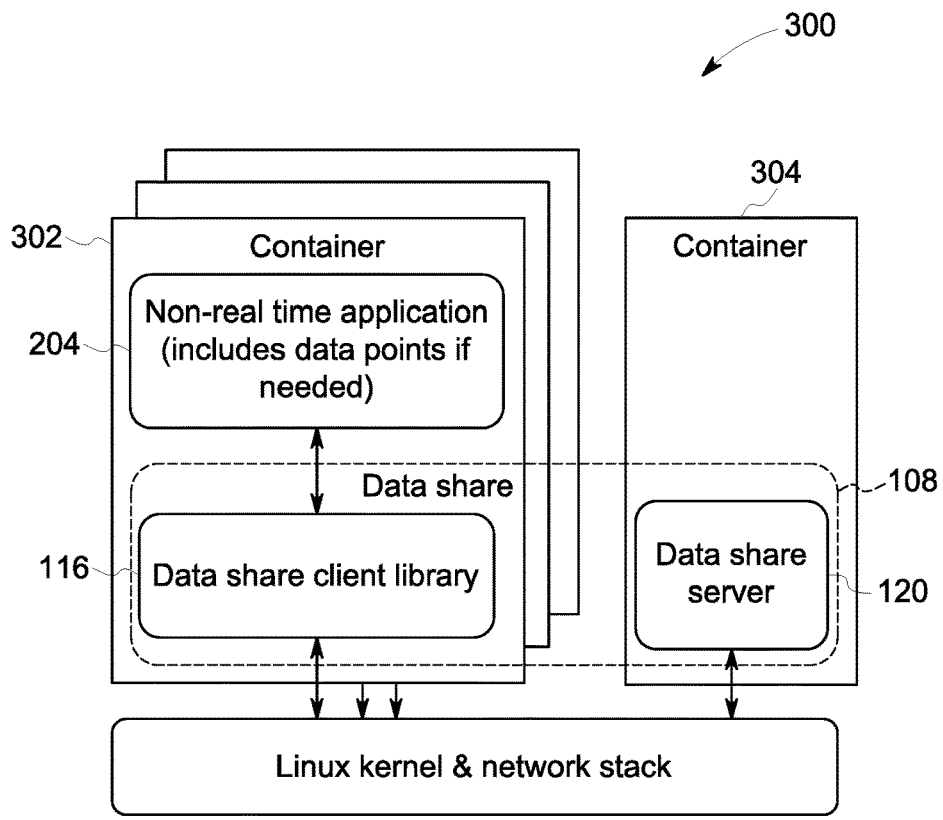
FIG. 3 illustrates a block diagram of a system architecture according to some embodiments.

FIG. 3 provides a deployment architecture 300 for the data share module 108 in the NRT domain 128 according to one or more embodiments. Each NRT application 204 may be executed as a standard user space software application inside a container 302. As used herein, the container 302 may refer to a stand-alone executable package of a piece of software that may include the components to run the software (e.g., code, runtime system tools, system libraries, settings, etc.) Examples of software package management systems include, but are not limited to Docker containers, Dpkg, OpenPKG, Fink, Zero Install, GetJAR, NuGet, etc. In one or more embodiments, the data share module 108 may include a data share client library 116 that may be linked to each NRT application 204 that may access the data share module during the application's execution. The NRT application 204 may use the data share client library 116, via an API, to create and work with appropriate data 129. In one or more embodiments, the application data 129 (e.g., the data being produced/consumed. For example, new sensor acquisition data, newly calculated values, system events, etc.) may reside in memory used by the data share server 120. In one or more embodiments, the data share server 120 may reside in and be executed in a separate data share server container 304. Copies of the data 129 may temporarily exist in a plurality of NRT application 204. The data copies may be under control of corresponding applications of the plurality of NRT applications 204, and may not be managed by the data share module 108. For example, data may be copied into an accelerator that works on the data, but isn't connected to the data share. In one or more embodiments, the NRT application 204 may communicate with the data share server 120 via a Linux kernel and network stack 306, or via any other suitable communication protocol. As a non-exhaustive example, the communication protocol may be a network attached storage device with a separate database manager (e.g., MySQL), a Windows Storage Server or the like.

Figure 4:
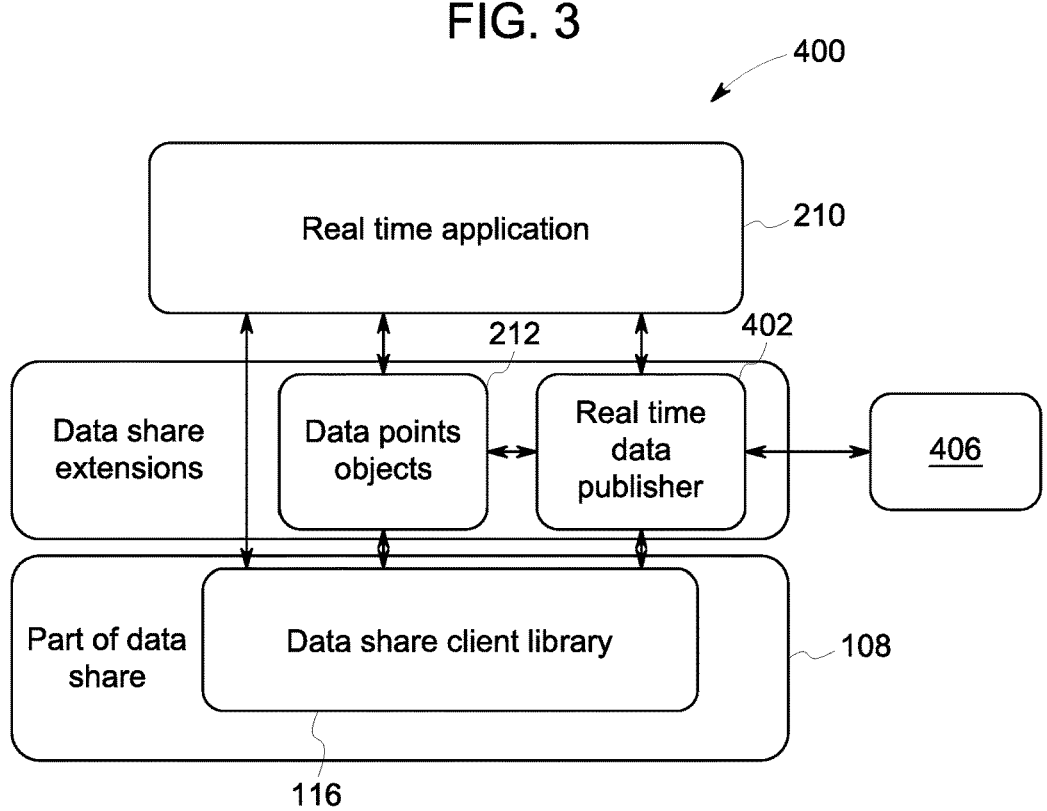
FIG. 4 illustrates a block diagram of a system architecture according to some embodiments.

FIG. 4 provides a deployment architecture 400 for the data share module 108 in the RT domain 126 according to one or more embodiments. In one or more embodiments, the RT application 210 may be executed as one of a kernel module in VxWorks 7 kernel space or as a standard user space application in Linux. Any other suitable combination of operating systems with at least one of them being a deterministic real-time operating system (RTOS), like VxWorks, QNX, Green Hills INTEGRITY, Sysgo, PikeOS, DDCi, DEOS, etc. may be used. The other operating systems may be an RTOS or not (e.g., Linux, Windows, OSX, Android OS, iOS, etc.). Other suitable execution spaces may be used. Like the NRT application 204, the RT application 210 may be linked to the data share client library 116. The RT application 210, in one or more embodiments, may work with data 129, whose values may be stored in the Data Share Server 120 (residing on the NRT domain 128 of the data share module 108), by using an API of the data share client library 116.

In one or more embodiments, the RT application 210 may be linked to a RT data publisher 402, and the RT application's data point objects 212. As used herein, the data point objects 212 may be attributes in the data objects. In one or more embodiments, the attributes may include at least one of a quality and a priority of the data object. The RT application 210 may use a Data Point API (not shown) to create and work with data point objects 212 whose values may be stored at known addresses. For example, Data Point APIs may include createDataPoint, which may create a Data Point object and populate it from associated data items, where the input parameter is a key and the output is a Data Point. As another example, the API may include getDataPoint to return a reference to the data point associated with a key, where the input parameter is a key and the output/result is a Data Point. As another example, the API may be push ValueToDataShare, which may push the value of the Data Point to an associated data item, where the input parameter is DataPoint. Other suitable APIs may be used. In one or more embodiments, the Data Point API may allow for the seamless transfer of data from one side to another. The inventors note that the Data Point API may be straightforward compared to other middle ware layers like OPC-UA and DDS. As such, the Data Point API may make data movement more simple when both sides understand the context of the data being moved. In one or more embodiments, the data point objects 212 may reside on the "heap" of the RT application 204, in a special System on Chip (SoC) memory regions, On Chip Memory (OCM) and Programmable Logic Block RAM (PLBRAM). As used herein, "heap" refers to a specialized tree-based data structure. The data point objects 212 may reside in any other suitable location.

The RT data publisher 402 may transfer data to the NRT domain 128 in an acceptable manner (e.g., not lost, properly time-tagged, etc.) that may allow the NRT domain 128 to process the data "off-line" (e.g., not in real time). In one or more embodiments, the RT data publisher 402 may push data from the RT domain 126 to the NRT domain 128 in a controlled way. For example, while receiving messages from the NRT domain 128, the RT domain 126 may be executing RT applications 210 responsible for the real-time operation of the asset 102. If the RT domain 126 were to answer every message from the NRT domain 128 as the message comes in, the RT domain 126 may choke and be unable to execute the RT applications 210 operating the assets 102. In one or more embodiments, the RT data publisher 402 may generate a schedule that fits the unscheduled (NRT) communications into the flow of the scheduled communications through the network. A benefit of this is that the messages from the NRT domain 128 may be responded to in a manner that does not negatively impact the RT domain's 126 operation of the asset.

Figure 5:
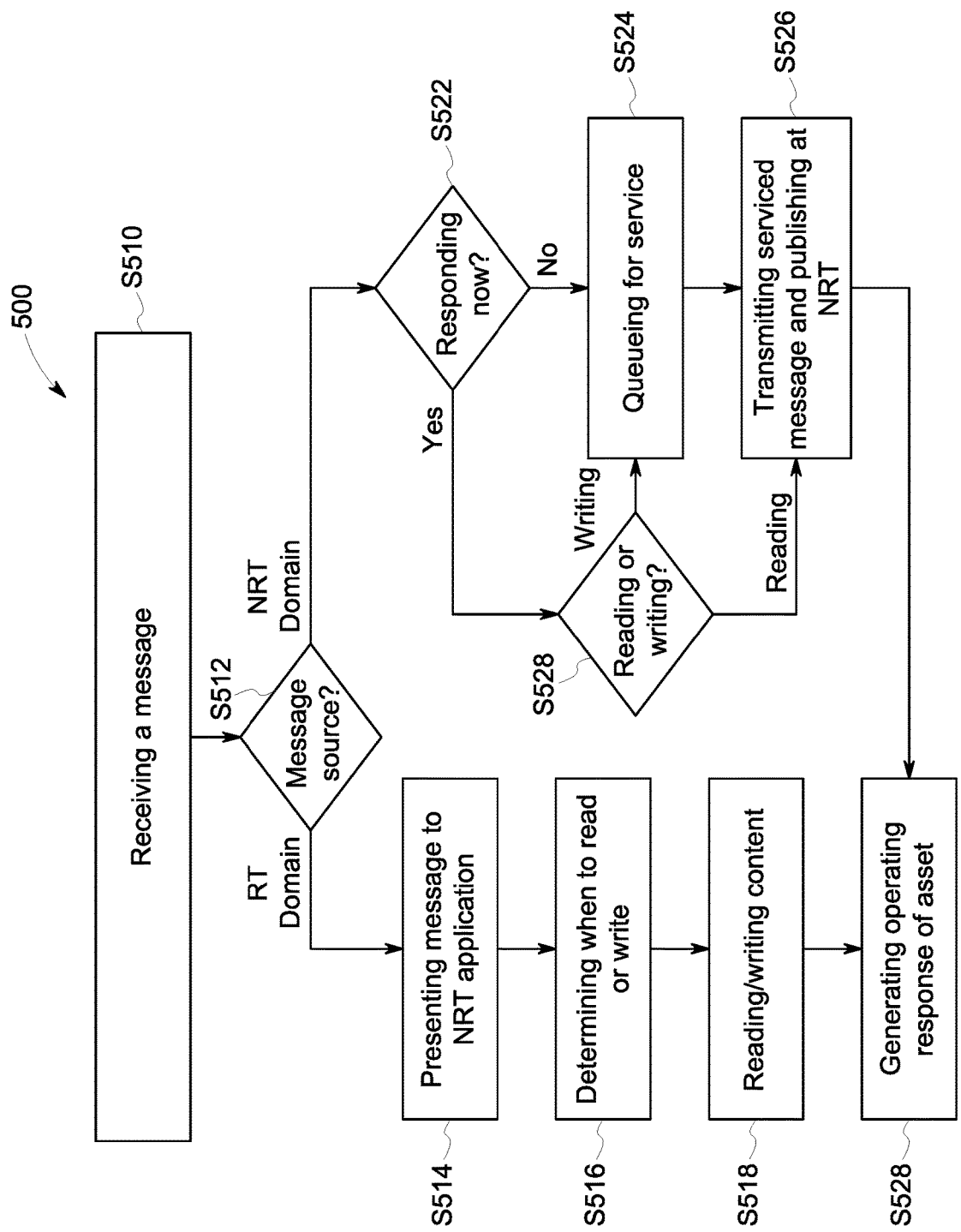
FIG. 5 illustrates a flow diagram according to some embodiments.

Turning to FIG. 5, a flow diagram of an example of operation according to some embodiments is provided. In particular, FIG. 5 provides a flow diagram of a process 500, according to some embodiments. Process 500, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 500 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

In one or more embodiments, prior to beginning process 500, each of the non-real-time (NRT) domain 128 and the real-time (RT) domain 126 may be executing normal operations of the asset per one or more NRT applications 204 and RT applications 210, respectively.

Initially, at S510, a message 201 (FIG. 5) is received at the data share module 108. In one or more embodiments, the message 201 may at least one of: request data, provide data, provide a command response and receive a command (e.g., messages that request an action, or system events such as errors, specific operations, etc.). The message 201 may contain other suitable data. In one or more embodiments, the message 201 may be received from (e.g., "message source") one of the real-time domain 126 and the non-real-time domain 128, where each domain may be implemented in a virtual machine. The inventors note that to facilitate the operation of the data share module 108 across the two domains, the data share module 108 may be deployed as a client-server solution in one or more embodiments. Other solutions may be used (e.g., a peer to peer solution may be used, but may include more monitoring on the RT domain).

Then in S512, the data share module 108 determines whether the message source is the RT domain 126 or the non-real-time domain 128. In one or more embodiments, the message 201 may include a source indicator (not shown). In one or more embodiments, in a system with two operating systems (OS) (e.g., RTOS and NRTOS), the source indicator may indicate where the request originated, which may help arbitrate between requests and support the quality of service mechanism. When the data share module 108 determines the message source is the RT domain 126, the data share module 108 may present the message 201 directly to the NRT application 204 in S514. After receipt of the message 201, the NRT application 204 may determine when the NRT application 204 may read or write the contents of the message 201 (e.g., data or an instruction) to the data share server 120 in S516. In S518, the NRT application 204 reads or writes the contents of the message 201 to the data share server.

When the data share module 108 determines, in S512, the message source is the NRT domain 128, the data share module 108 may present the message 201 to the RT Publisher 402 in S520. Then in S522, the RT Publisher 402 may determine when the RT domain 126 may respond to the message 201 (e.g., when the RT domain has enough non-core resources to honor the request—processing time, memory resources, bandwidth, and other factors. "Non-core resources" may refer to excess capability above and beyond what is needed to perform its primary control function(s)). In one or more embodiments, the RT Publisher 402 may analyze the message to determine the priority assigned to the message and the data being requested. The RT Publisher 402 may also analyze the normal operations of the RT domain 126 to determine what the RT domain needs, in terms of enough non-core resources to honor the request (e.g., processing time, memory resources, bandwidth, and other factors) to complete the job. In one or more embodiments, the RT Publisher 402 may access a RT Data Acquisition and Message Handler 406 (FIG. 4) to determine an amount of resources left (e.g., bandwidth) in a particular data frame that may be transmitted next to core functions (e.g., functions required to perform the primary control function(s)), as part of the regular operations of the RT Data Acquisition and Message Handler 406. The determination may be based on the priority and data requested, as well as the needs of the RT domain to complete its currently executing jobs. In one or more embodiments, the priority may be assigned to the message at design time of the application. In one or more embodiments, the priority may be more dynamic. In one or more embodiments, the classification may be determined based on the functions provided by the application, for example.

In one or more embodiments, the RT Publisher 402 may measure per time unit how much time it may take to service the message (e.g., provide a "response") and whether the servicing of this particular message 201 fits in the amount of time left in the particular frame. The RT Publisher 402, in one or more embodiments, may analyze rules determined by system requirements and standards for messaging to determine when the message 201 may be serviced. It is noted, the servicing of the message 201 from the NRT domain 128 may not impeded the operations of the RT domain 126; the RT domain 128 may run with the same response time at all times.

When the RT Publisher 402 determines in S522 the determined bandwidth for the response is unavailable, the message 201 may not be responded to in the next data frame, and the data share module 108 may then send the message to a queue for servicing by the RT Data Acquisition and Message Handler 406 at S524. Next, after the message 201 is serviced, the serviced message (e.g., "response") may be transmitted in a data frame by the RT Data Acquisition and Message Handler in a flow of the scheduled communications (e.g. at an available time) in S526, and published directly at the NRT domain 128. In one or more embodiments, more requests may be generated by the NRT domain 128 than the RT domain 126 may be able to process. In that case, NRT requests may not be serviced, and the NRT application may accommodate that situation.

When the RT Publisher 402 determines in S522 the determined bandwidth is available and the message may be responded to in the next frame, the data share module 108 may then determine in S528 whether the message 201 includes a read request or a write request. When the message 201 includes a read request, the data share module 108 may service the request and may then publish the data to the NRT domain 128 in S526. When the message 201 includes a write request, the data share module 108 may send the message 201 to the RT Data Acquisition and Message Handler 406, as in S524, and the process may continue as above.

In one or more embodiments, the RT Publisher (or RT data Acquisition and Message Handler) may attach a time tag to the result indicating when the response was determined.

After the data is published in the NRT Domain 128, the NRT domain 128 may further process the response in a manner that may then be used to manipulate operation of the asset 102. For example, the NRT domain 128 may process the results to produce a report or suggestion that indicates a change should be made to the asset's operation to achieve some objective. Then, this data may be transferred back to the RT domain 128 via the data share module 108, where the RT domain 126 may implement a change and then an operating response of the asset 102 may be generated in S528. In one or more embodiments, the RT domain determines whether to implement the suggested change, as the RT domain may be responsible for the safe operation of the asset.

Figure 6:
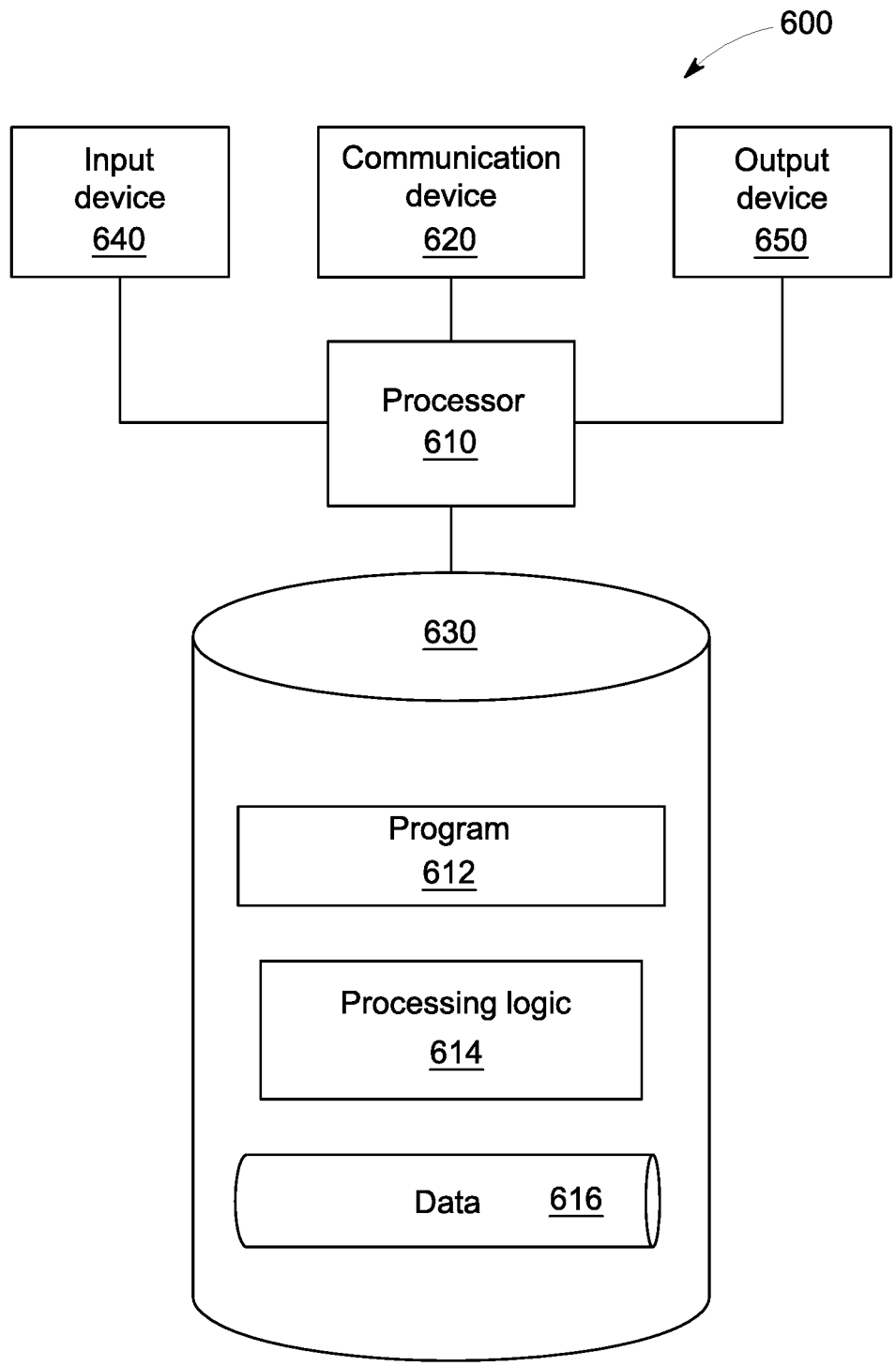
FIG. 6 illustrates a block diagram of a system architecture according to some embodiments.

Note the embodiments described herein may be implemented using any number of different hardware configurations. For example, FIG. 6 illustrates a data share platform 600 that may be, for example, associated with the system 100 of FIG. 1. The data share platform 600 comprises a data share processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users. The data share platform 600 further includes an input device 640 (e.g., a mouse and/or keyboard to enter information) and an output device 650 (e.g., to output the outcome of application execution).

The processor 610 also communicates with a memory/storage device 630. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or data share processing logic 614 for controlling the processor 610. The processor 610 performs instructions of the programs 612, 614, and thereby operates in accordance with any of the embodiments described herein. For example, the processor 610 may receive a message and then may apply the instructions of the programs 612, 614 to transfer data between the NRT domain and the RT domain.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 400 from another device; or (ii) a software application or module within the platform 400 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
at least one asset;
a computer programmed with a data share module for the asset, the data share module for controlling data flow in the asset;
the computer including a data share processor and a memory in communication with the data share processor, the memory storing the data share module and additional program instructions, wherein the data share processor is operative with the data share module and additional program instructions to perform functions as follows:
 receiving a message from a source at the data share module;
 determining, via the data share module, whether the source is one of a non-real time domain of the asset and a real-time domain of the asset;
 determining, via the data share module, an available time when a destination is able to respond to the message, wherein the destination is one of the non-real time domain and the real-time domain, and wherein the destination is different from the source;
 transmitting, via the data share module, the message directly to the destination when the destination is able to respond to the message;
 receiving a response to the message; and
 generating an operating response of the asset based on the response.

2. The system of claim 1, wherein determining when the destination is able to respond to the message further comprises:
determining a priority associated with the message.

3. The system of claim 2 wherein determining when the destination is able to respond to the message further comprises:
determining an available bandwidth for the response.

4. The system of claim 3, wherein the source is the non-real time domain and the destination is the real-time domain of the asset.

5. The system of claim 4, further comprising additional program instructions to perform functions as follows:
queuing the message to a real-time data acquisition and message handler when the determined bandwidth for the response is presently unavailable.

6. The system of claim 4, further comprising additional program instructions to perform functions as follows:
determining whether the message includes a read request or a write request when the determined bandwidth for the response is presently available.

7. The system of claim 6, further comprising additional program instructions to perform functions as follows:
presenting the response at a non-real time system.

8. A computer-implemented method comprising:
receiving a message from a source at the data share module;
 determining, via the data share module, whether the source is one of a non-real time domain of the asset and a real-time domain of the asset;
 determining, via the data share module, an available time when a destination is able to respond to the message, wherein the destination is one of the non-real time domain and the real-time domain, and wherein the destination is different from the source;
 transmitting, via the data share module, the message directly to the destination when the destination is able to respond to the message;
 receiving a response to the message; and
 generating an operating response of the asset based on the response.

9. The method of claim 8, wherein determining when the destination is able to respond to the message further comprises:
determining a priority associated with the message.

10. The method of claim 9 wherein determining when the destination is able to respond to the message further comprises:
determining an available bandwidth for the response.

11. The method of claim 10, wherein the source is the non-real time domain and the destination is the real-time domain of the asset.

12. The method of claim 11, further comprising:
queuing the message to a real-time data acquisition and message handler when the determined bandwidth for the response is presently unavailable.

13. The method of claim 11, further comprising:
determining whether the message includes a read request or a write request when the determined bandwidth for the response is presently available.

14. The method of claim 13, further comprising:
presenting the response at the non-real time domain.

15. A non-transitory, computer-readable medium storing instructions that, when executed by a computer processor, cause the computer processor to perform a method comprising:
receiving a message from a source at the data share module;
 determining, via the data share module, whether the source is one of a non-real time domain of the asset and a real-time domain of the asset;
 determining, via the data share module, an available time when a destination is able to respond to the message, wherein the destination is one of the non-real time domain and the real-time domain, and wherein the destination is different from the source;
 transmitting, via the data share module, directly to the destination, the message when the destination is able to respond to the message;
 receiving a response to the message; and
 generating an operating response of the asset based on the response.

16. The non-transitory, computer-readable medium of claim 15, wherein determining when the destination is able to respond to the message further comprises:
determining a priority associated with the message.

17. The non-transitory, computer-readable medium of claim 16 wherein determining when the destination is able to respond to the message further comprises:
determining an available bandwidth for the response.

18. The non-transitory, computer-readable medium of claim 17, wherein the source is the non-real time domain and the destination is the real-time domain of the asset.

19. The non-transitory, computer-readable medium of claim 18, further comprising additional program instructions to perform functions as follows:
   queuing the message to a real-time data acquisition and message handler when the determined bandwidth for the response is presently unavailable.

20. The non-transitory, computer-readable medium of claim 18, further comprising additional program instructions to perform functions as follows:
   determining whether the message includes a read request or a write request when the determined bandwidth for the response is presently available.

21. The non-transitory, computer-readable medium of claim 20, further comprising additional program instructions to perform functions as follows:
   presenting the response at the non-real time domain.

* * * * *